United States Patent [19]

Chang

[11] Patent Number: 5,154,110

[45] Date of Patent: Oct. 13, 1992

[54] ESPRESSO/CAPPUCCINO MACHINE

[76] Inventor: Jack Chang, 5 Fl., No. 312, Sec. 2, Shu Lin St., Tainan, Taiwan

[21] Appl. No.: 637,451

[22] Filed: Jan. 4, 1991

[51] Int. Cl.$^5$ .................. A47J 31/30; A47J 31/46; A47J 31/56

[52] U.S. Cl. .................. 99/281; 99/293; 99/295; 99/302 R

[58] Field of Search .................. 99/279, 280, 281, 282, 99/283, 288, 290, 291, 293, 294, 295, 299, 300, 302 R, 304, 305, 306, 307, 316; 426/433; 126/369; 122/13 A, 406.1, 408.1, 408.2; 137/209; 219/401; 392/401, 400, 445, 450

[56] References Cited

U.S. PATENT DOCUMENTS

| | | | |
|---|---|---|---|
| 1,995,814 | 3/1935 | Parker | 392/400 |
| 2,088,966 | 8/1937 | Lyons | 99/294 |
| 2,152,410 | 3/1939 | Illy | 99/290 |
| 3,031,947 | 5/1962 | Heuckeroth | 99/294 |
| 4,575,615 | 3/1986 | Shigenobu | 99/279 |
| 4,634,838 | 1/1987 | Berz | 99/307 |

*Primary Examiner*—Philip R. Coe
*Assistant Examiner*—Terrence R. Till
*Attorney, Agent, or Firm*—Merchant, Gould, Smith, Edell, Welter & Schmidt

[57] ABSTRACT

An espresso/cappuccino machine includes an upper container defining an upper chamber therein, a lower container defining a lower chamber therein, and a selector valve. A first pipet extends from nearly a bottom of the upper chamber to outside of the upper chamber. A first heating element with a first thermal control element is disposed in the bottom of the upper chamber. A second heating element with a second thermal control element is disposed in the bottom of the lower chamber. A second pipet communicates the upper chamber and the lower chamber. A check valve is provided in the second pipet such that fluid is only flowable from the upper chamber to the lower chamber. The selector valve has a first port in fluid communication with an opening on the upper container above an upper limit of water level in the upper container, a second port in fluid communication with a steam pipe, and a third port in fluid communication with a first end of a third pipet which has a second in fluid communication with a second opening on the lower container above a water level in the lower chamber. The selector valve has a lever to block the third pipet or to communicate the third pipet to either the upper chamber or to the steam pipe.

7 Claims, 4 Drawing Sheets

5,154,110

ESPRESSO/CAPPUCCINO MACHINE

BACKGROUND OF THE INVENTION

The present invention relates to an espresso/cappuccino machine, and more particularly to a machine which selectively outputs hot water via a first output for espresso infusion or outputs steam via a second output for injecting into milk for subsequent infusion into espresso to make cappuccino.

It is known to use hot water for making espresso under high pressure condition in which the best temperature at which to make espresso is from 90° to 100° C., as at this condition the espresso will obtain the good aroma and rich golden froth floating on the surface of the coffee that best characterizes espresso. It is also known to add cream, milk, brandy, cocoa, and the like into the espresso to make cappuccino.

FIG. 4 of the drawings shows a conventional espresso machine consisting of a hermetically sealed main body 10 with a cover 20 on top and a heating element (not shown) in its bottom. When water poured into the main body 10 is heated, the top of the body 10 fills with steam. As temperature increases, pressure correspondingly increases in a closed system. When pressure in the main body 10 is greater than atmospheric pressure, the hot water passes through a duct 40 and combines with the espresso in a coffee basket 41. It is commonly known that higher pressure produce a better quality espresso. However, the hot water, actually combined with steam, having a temperature higher than 100° C. at the outlet of the duct 40 always causes the espresso to have a strong, bitter, or burnt taste.

To this end, another construction utilizes a pump as the power source to move water at a specified temperature (90° to 100° C.) to mix with the espresso. The pump type espresso machine provides improved tasting espresso compared to the espresso made by the above-mentioned conventional espresso machine. However, construction of the pump type espresso machine is extremely expensive. The present invention provides an economic espresso machine which provides water with appropriate temperature suitable to make espresso with aroma and rich flavor. Furthermore, it is found that if high pressure steam is introduced into milk, the latter froths and such froths provide a wonderful taste when the frothy milk is applied to espresso to make cappuccino. Therefore, the present invention also provides an espresso/cappuccino machine which generates steam for frothing milk for preparation of cappuccino.

SUMMARY OF THE INVENTION

An espresso/cappuccino machine according to the present invention includes an upper container defining an upper chamber therein, a lower container defining a lower chamber therein, and a selector valve. The upper container has a water inlet through which water is passable into the upper chamber. A first pipet extends from nearly a bottom of the upper chamber to outside of the upper chamber. A first heating element with a first thermal control element is disposed in the bottom of the upper chamber for controlling the temperature of the water in the upper chamber to be around 90° to 100° C., preferably 95° to 100° C. A second heating element with a first thermal control element is disposed in the bottom of the lower chamber for controlling the water in the lower chamber to be around 130° to 165° C., preferably 150° to 165° C., and that the pressure of steam in the lower chamber is around 5 to 7 bars.

A second pipet communicates the upper chamber and the lower chamber. A check valve is provided in the second pipet such that fluid is only flowable from the upper chamber to the lower chamber. The selector valve has a first port in fluid communication with an opening on the upper container above an upper limit of water level in the upper container, a second port in fluid communication with a steam pipe, and a third port in fluid communication with a first end of a third pipet which has a second in fluid communication with a second opening on top of the lower container. The selector valve has a lever to block the third pipet or to communicate the third pipet to either the upper chamber for outputting 95° C. water for making espresso or to the steam pipe for frothing milk for making cappuccino.

Accordingly, it is a primary object of the present invention to provide an economic espresso/cappuccino machine which selectively outputs hot water with appropriate temperature to make espresso or outputs high pressure steam for frothing milk for cappuccino.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
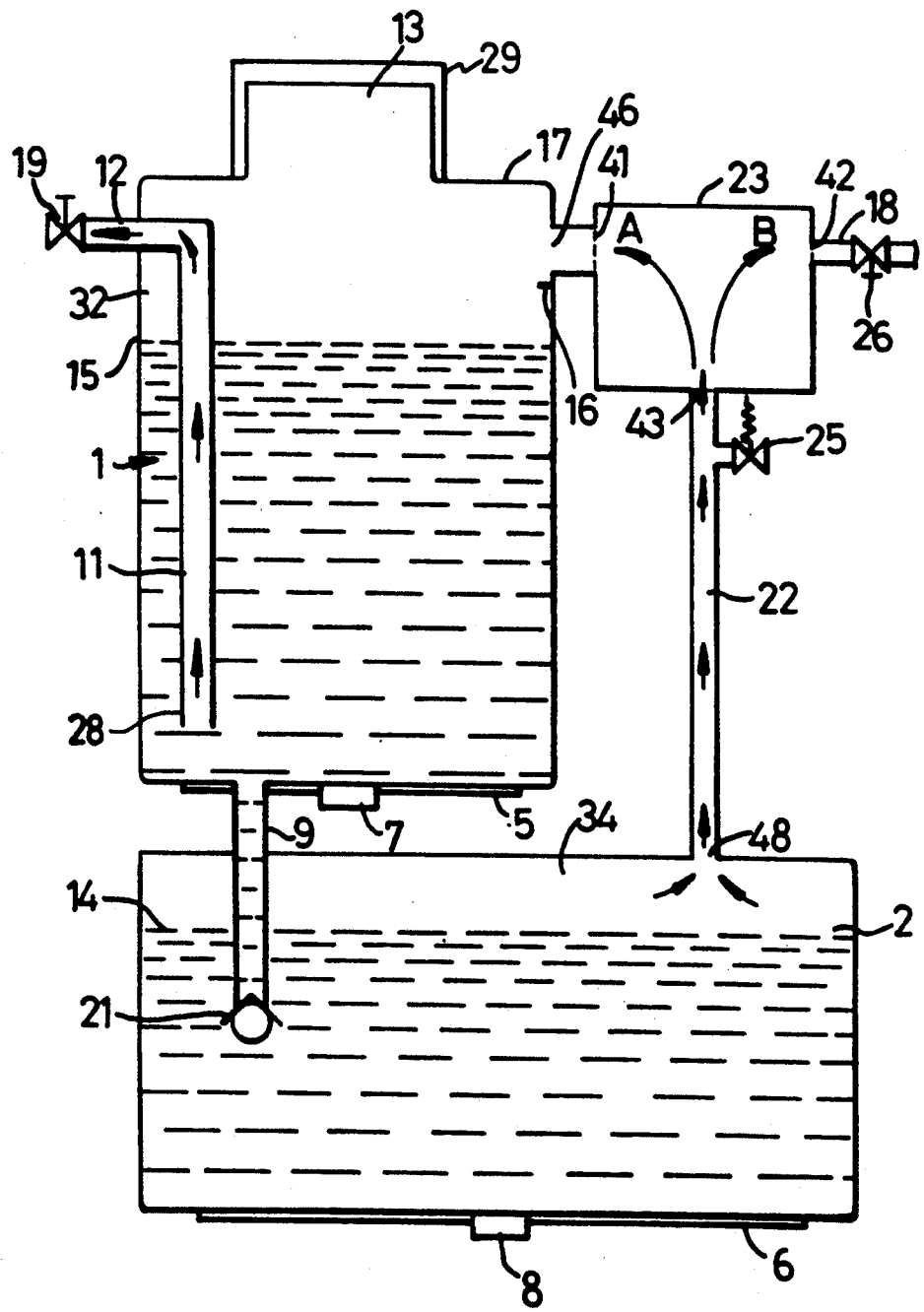
FIG. 1 is a schematic cross-sectional view of an espresso/cappuccino machine according to the present invention.
Figure 2:
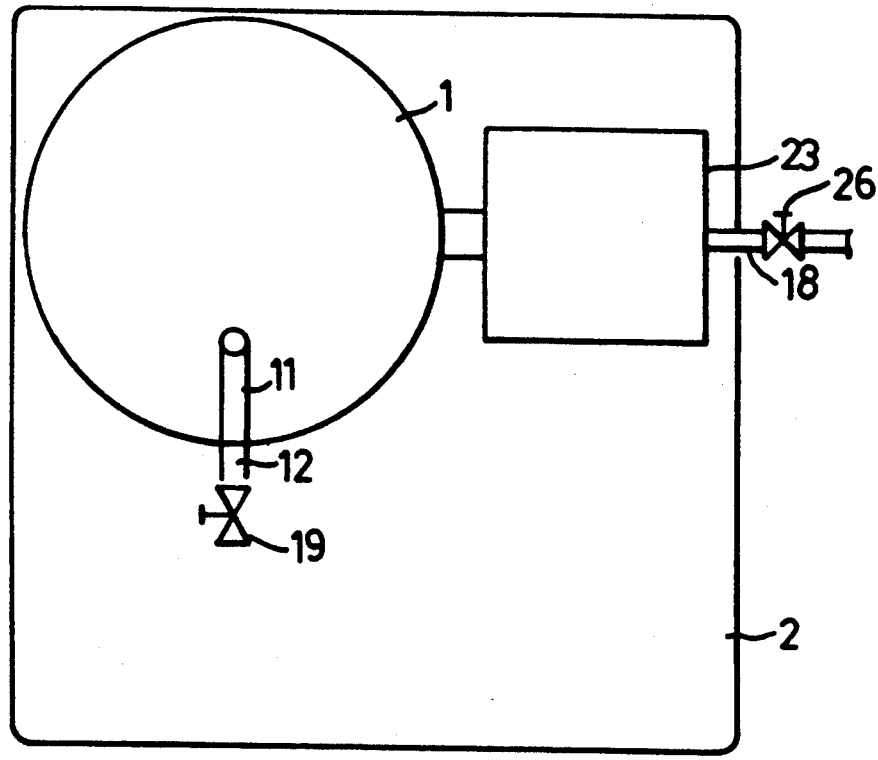
FIG. 2 is a schematic top view of the espresso/cappuccino machine.
Figure 3:
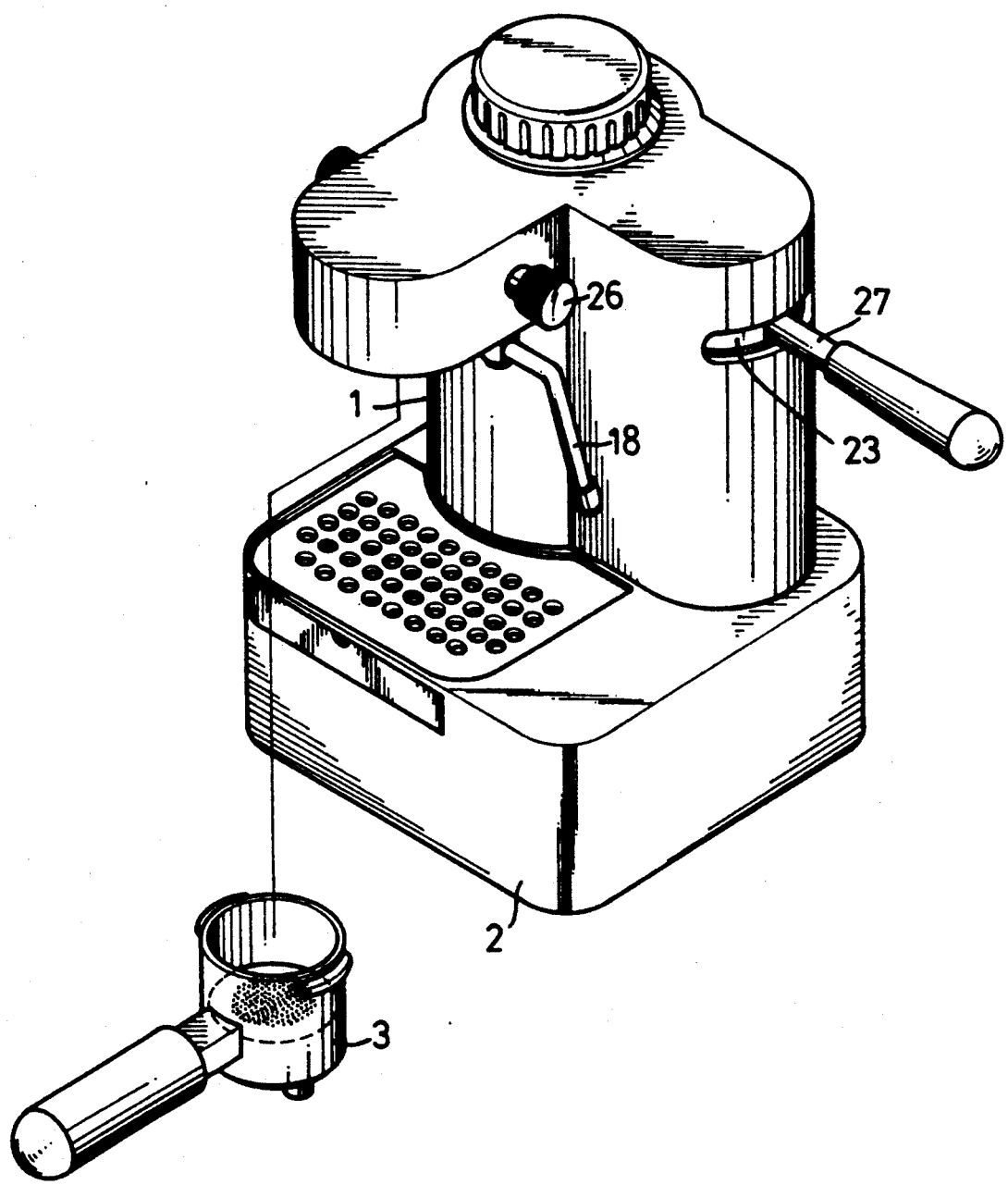
FIG. 3 is a perspective view of the espresso/cappuccino machine.
Figure 4:
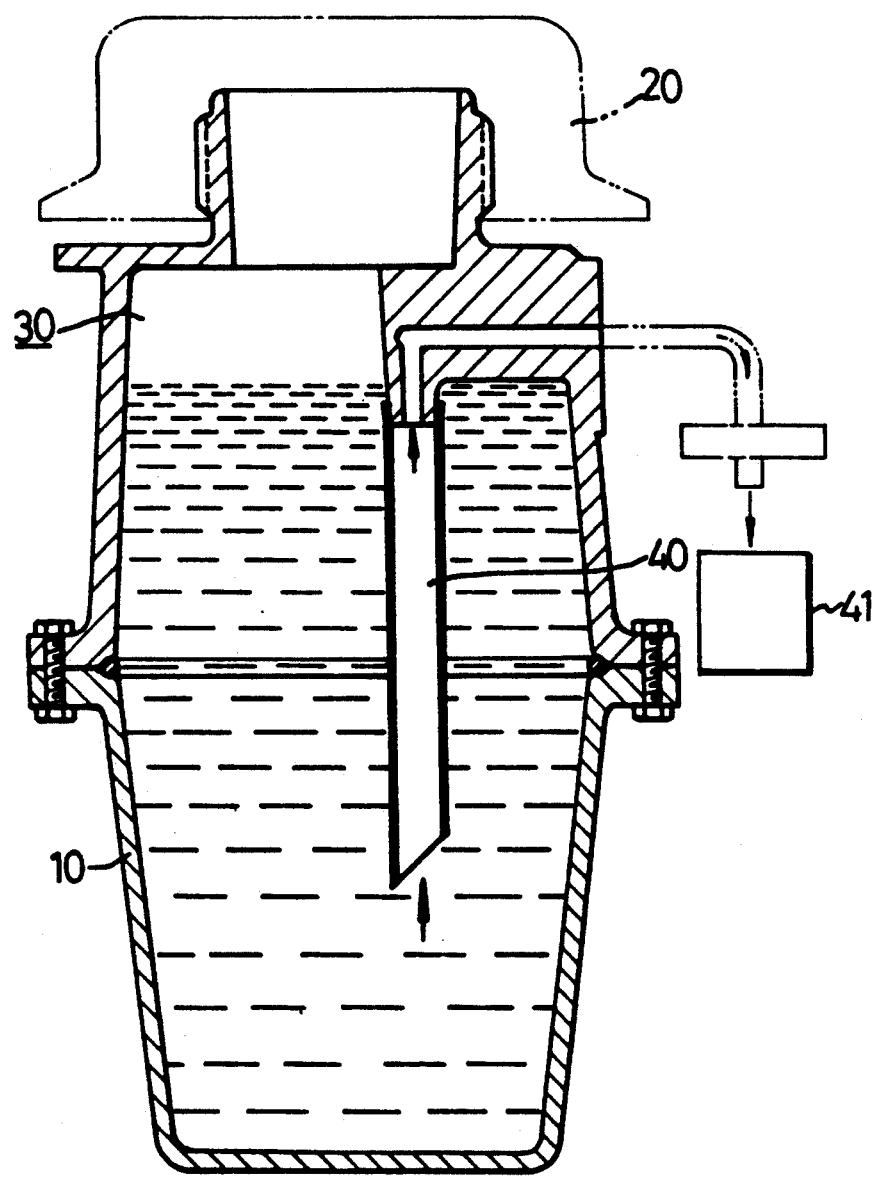
FIG. 4 is a sectional view of a conventional espresso machine.

Referring to FIGS. 1 through 3, an espresso/cappuccino machine according to the present invention comprises an upper container 1 defining an upper chamber 32 therein, a lower container 2 defining a lower chamber 34 therein, and a selector valve 23. In a bottom of the upper container 1 is a first heating means 5 for heating water in the first chamber 32. Within this heating region is a first thermal control means 7 which turns off the first heating means 5 at a predetermined temperature, for example, 95° C., so as to maintain the temperature of the water in the upper chamber 32 to be in the range of 95° to 100° C.

A first pipet 11 is substantially L-shaped, with a first end 12 penetrating a wall 15 of the upper container 1 and a second end 28 extending nearly to the bottom of the upper container 1. A valve means 19 set in the first end 12 of the first pipet 11 controls the flow of water. An upper limit 16 of water level on an inner side of the upper container 1 indicates the allowable maximum water level. On the top of the upper container 1 is a water inlet 13 with a removable sealing cover 29, and at the bottom of the upper container 1 is a second pipet 9 extending into the lower container 2. A check valve 21 is provided at a lower end of the second pipet 9, such that fluid is only flowable from the upper chamber 32 into the lower chamber 34. A second heating means 6 in the bottom of the lower chamber 2 is provided with a second thermal control means 8 for controlling the temperature in the lower chamber 34 to be around 130° to 165° C., preferably 150° to 165° C., such that the pressure of steam generated in the lower chamber 34 is around 5 to 7 bars.

The selector valve 23 has a first port 41 in fluid communication with an opening 46 on the upper container 1 above the upper limit 16, a second port 42 in fluid communication with a steam pipe 18, and a third port 43 in fluid communication with a first end of a third pipet 22 which has a second end in fluid communication with a second opening 48 on the lower container 2 above the water level 14 in the lower chamber 34. A pressure relief valve 25 is provided on the third pipet 22 for releasing excessive pressure of steam.

The selector valve 23 has a lever 27 by which the user may select either to block the third pipet 22 or to connect the third pipet 22 to either the upper chamber 32 or to the steam pipe 18. A knob means 26 is used to open or close the steam pipe 18. When water is still heating, the selector valve 23 is set such that the third port 42 is blocked. When water in the upper chamber 32 reaches a pre-determined temperature, for example 95° C., a light (not shown) signals the user that he may pivot the lever 27 to a first position, such as to allow steam in the lower chamber 34 to flow to the upper chamber 32, as shown by arrow A in FIG. 1. After water in the lower chamber 34 reaches a second predetermined temperature, for example, 150° C., the light is off and the user may pivot the lever 27 to a second position to allow steam in the lower chamber 34 to flow to the steam pipe 18, as shown by arrow B in FIG. 1. When the lever 27 is in its third position, the third port 43 is blocked.

OPERATION

It is understood that the following description is used for illustration only, not to limit the present invention.

Water is added through the inlet 13 into the upper chamber 32, to fill the lower chamber 34 to a specific level 14 (in which the air pressure of the lower chamber 34 is high enough to block the check valve 21), and in the mean time to fill the upper chamber 32 until it reaches to some level which is below the upper limit 16 of water level.

Thereafter, water in the upper chamber 32 is heated to the range of 95° C. to 100° C. by the first heating means 5 under activation of a power switch (no shown). In the means time, water in the lower chamber 34 is heated until the temperature reaches around 150° to 165° C. and the steam pressure in the lower chamber 34 is around five to seven bars. The check valve 21 prevents high pressure steam from returning to the upper chamber 32; instead the high pressure steam is forced through the third pipet 22 to the selector valve 23 as shown by arrows in FIG. 1.

When the lever 27 is in its first position, high pressure steam enters the upper chamber 32 to force 95° C. water in the upper chamber 32 through the first pipet 11 to the first end 12 thereof to perfuse through espresso powder in a basket 3 (see arrows in the first pipet 12). Although high pressure steam is conveyed to the upper chamber 32, it does not contain enough heat to increase the temperature of the water in the upper chamber 32 over 100° C. through the short serving period. Thus, water coming from the outlet 12 has high pressure (about 5 bars) and low temperature (around 95° C. When the lever 27 is in its second position, steam of high temperature and high pressure is released through the steam tube 18. The steam can be used to froth milk which can be added into espresso to make cappuccino. Some other ingredients, such as brandy, cocoa, and coconut can be added to make different flavors of cappuccino.

Although the invention has been explained in relation to its preferred embodiment, it is to be understood that many other possible modifications and variations can be made without departing the spirit and scope of the invention as hereinafter claimed.

I claim:

1. An espresso/cappuccino machine comprising:
   an upper container defining an upper chamber therein, comprising a water inlet through which water is filled into said upper chamber and a sealing cover releasably mounted on said water inlet;
   a first heating means disposed to a bottom of said upper chamber for heating water therein;
   a first thermal control means for maintaining temperature of water in said upper chamber to be in a range of 90° to 100° C.;
   a first pipet being disposed in said upper chamber and having a first end disposed through said upper container, extending to an outside thereof, and a second end extending downward nearly to said bottom of said upper chamber, such that said first pipet serves as a conduit for dispensing water in said upper chamber to said outside of said upper container;
   a lower container defining a lower chamber therein;
   a second pipet communicating said upper chamber with said lower chamber, a check means being provided in said second pipet, such that fluid is only flowable from said upper chamber to said lower chamber;
   an opening formed on an upper wall of said lower chamber;
   a second heating means and a second thermal control means for generating steam in said lower chamber and maintaining water in said lower chamber to around 130° to 165° C. and with a pressure at a pre-determined range;
   selector valve means attached to a lever and having three manually selectable positions for selectively outputting steam from the lower chamber, the selector valve means including a first port in fluid communication with said upper chamber at a position above a water level in said upper chamber, a second port in fluid communication with a steam pipe which is accessible to a user on the outside of the espresso/capuccino machine, and a third port in fluid communication with a first end of a third pipet which has a second end in fluid communication with said opening, said third port being in fluid communication with said first port when said selector valve means is in a first one of said selectable positions for outputting water from said upper chamber to the outside via said first pipet to a basket holding coffee for making espresso, said third port being in fluid communication with said second port when said selector valve means is in a second one of said selectable positions for outputting steam from said lower chamber to the outside via said steam pipe for frothing milk for making cappuccino, said third port being blocked from said upper chamber and said steam pipe when said selector valve means is in a third one of said selectable positions.

2. The espresso/capuccino machine as claimed in claim 1, wherein a first opening is formed on a wall of said upper container and is in fluid communication with said first port of said selector valve.

3. The espresso/cappuccino machine as claimed in claim 1, further comprising a knob means for controlling opening and closing of said steam pipe.

4. The espresso/cappuccino machine as claimed in claim 1, further comprising a valve means at said second end of said first pipet for controlling opening and closing of said first pipet.

5. The espresso/capuccino machine as claimed in claim 1, wherein the pressure of steam in said lower chamber is retained between 5 bars to 7 bars.

6. The espresso/cappuccino machine as claimed in claim 1, wherein the temperature of the water in said upper chamber is preferably retained at 95° C.

7. The espresso/cappuccino machine as claimed in claim 1, wherein the temperature of water is said lower chamber is preferably retained at 150° C.

* * * * *